United States Patent [19]

Nakamura

[11] Patent Number: 4,724,493
[45] Date of Patent: Feb. 9, 1988

[54] FLOPPY DISK DRIVE INTERFACE CIRCUIT

[75] Inventor: Nobutaka Nakamura, Tokyo, Japan

[73] Assignee: Kabushiki Kaisha Toshiba, Kawasaki, Japan

[21] Appl. No.: 884,639

[22] Filed: Jul. 11, 1986

[30] Foreign Application Priority Data

Jul. 29, 1985 [JP] Japan ................... 60-167237

[51] Int. Cl.⁴ .................................. G11B 5/09
[52] U.S. Cl. .......................... 360/51; 360/40
[58] Field of Search ............ 375/120; 360/51, 40, 360/46

[56] References Cited

U.S. PATENT DOCUMENTS 4,644,419 2/1987 Iinuma et al. ................... 360/51

Primary Examiner—Vincent P. Canney
Attorney, Agent, or Firm—Finnegan, Henderson, Farabow, Garrett & Dunner

[57] ABSTRACT

A floppy disk drive interface circuit of the invention has a counter/selector for counting the pulse width of a window signal supplied from a voltage frequency oscillator. When a window pulse having a pulse width longer or shorter than a preset pulse width is input, counter/selector supplies a disable signal to AND gate 22. AND gate 22 blocks window signal 12 from VFO2 being supplied to FDC 3.

1 Claim, 19 Drawing Figures

FIG. 5A 250Kbps WINDOW PULSE
FIG. 5B 300 Kbps WINDOW PULSE
FIG. 5C GATED 250Kbps WINDOW PULSE IN 250 Kbps MODE
FIG. 5D GATED 300kbps WINDOW PULSE IN 250 Kbps MODE
FIG. 5E GATED 250 Kbps WINDOW PULSE IN 300 Kbps MODE
FIG. 5F GATED 300Kbps WINDOW PULSE IN 300 Kbps MODE

FIG. 6

FLOPPY DISK DRIVE INTERFACE CIRCUIT

BACKGROUND OF THE INVENTION

The present invention relates to a floppy disk drive (hereinafter referred to as FDD) window signal gate circuit used in an FDD interface mechanism in which the data transfer rate of an FDD is unknown.

In a conventional 5.25" FDD, use is made of a recording medium having either double-sided, double-density, double tracks (2DD type) or double-sided, double-density tracks (2D type). The recording medium is driven at 300 rpm by a spindle motor. The data transfer rate in the read operation is 250 kbps.

A recording medium having double-sided, high-density, double tracks (2HD type) has also been developed. When this medium is driven, the rotational frequency of the spindle motor for an FDD is 360 rpm, and the data transfer rate in the read operation is 500 kbps.

A disk drive for 2HD type medium can drive a recording medium of 2DD or 2D type. Since the rotational frequency of the spindle motor used in this disk drive is 360 rpm, the data transfer rate is 300 kbps.

In some 2HD type disk drives, the rotational frequency of the spindle motor is switched between 360 and 300 rpm. However, an extra wait time must be required for switching the rotational frequency of the spindle motor.

Figure 1:
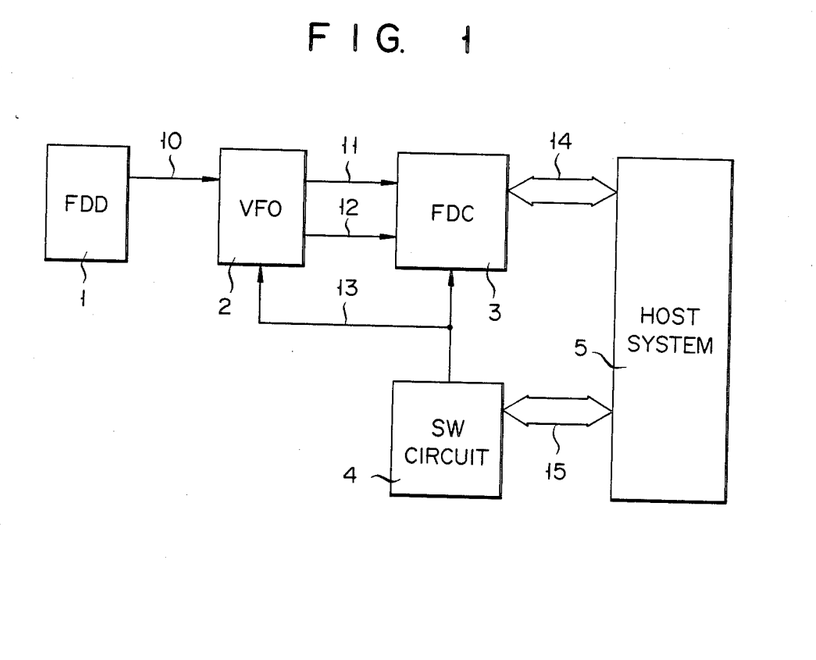
FIG. 1 is a block diagram of a conventional FDD interface circuit.

It is desired that an FDD interface circuit be compatible with three data transfer rates of 250 kbps, 300 kbps, and 500 kbps. A conventional FDD interface circuit consists of voltage frequency oscillator (VFO) 2, floppy disk controller (FDC) 3, and switching circuit 4, as shown in FIG. 1. Data 10 read from floppy disk drive unit (FDD) 1 is supplied to VFO 2. VFO 2 creates read data 11 and window signal 12 from data 10, and supplies them to FDC 3. FDC 3 receives read data 11 and window signal 12. Switching circuit 4 supplies a signal (250 kbps, 300 kbps, or 500 kbps) for switching the data transfer rate to VFO 2 and FDC 3.

Figure 2:
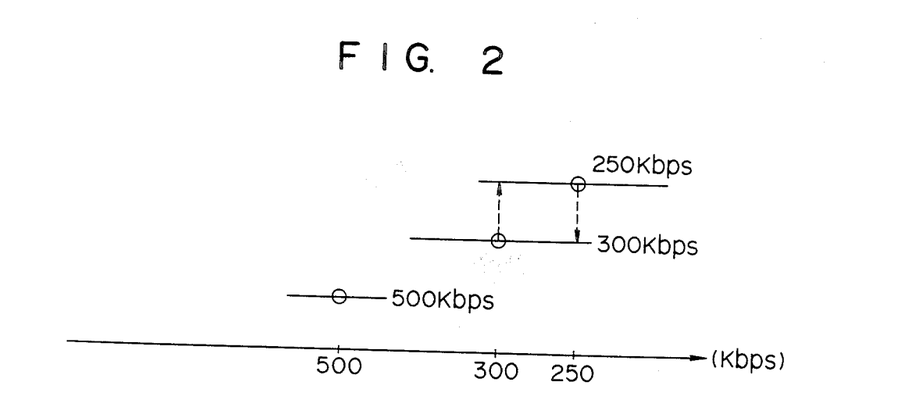
FIG. 2 is a view explaining a plurality of data transfer rates and respective capture ranges.

Host system 5 reads data from FDD 1. Host system 5 and FDC 3 are connected by bus 14, and host system 5 and switching circuit 4 are connected by bus 15. Even if the data transfer rate of data 10 slightly fluctuates by VFO 2, FDC 3 can correctly read ID information and data. Therefore, the data transfer rate has some allowance in all of the 250 kbps, 300 kbps, and 500 kbps modes. This allowance is called a capture range. In the 250 kbps and 300 kbps modes, the center frequencies are close to each other. Therefore, if the capture range of VFO 2 is wide, the transfer rates overlap as shown in FIG. 2. When this occurs, in the 300 kbps mode, data written in the 250 kbps mode is read as indicated by the broken lines in FIG. 2. Conversely, in the 250 kbps mode, data written in the 300 kbps mode is read. Therefore, host system 5 cannot correctly identify the mode.

SUMMARY OF THE INVENTION

It is an object of the present invention to provide a floppy disk drive interface circuit which allows a host system to correctly identify the data transfer rate in an FDD interface which can select a data transfer rate.

In order to achieve the object of the present invention, there is provided a floppy disk drive (window signal gate) circuit for use in a system handling a plurality of data transfer rates, comprising:

a floppy disk drive;

a voltage frequency oscillator for outputting a read data signal and a window signal based on a read data pulse generated by the floppy disk drive;

a fundamental frequency signal generator for generating a fundamental frequency signal;

means for receiving the fundamental frequency signal from the fundamental frequency signal generator and the window signal from the voltage frequency oscillator and for measuring a pulse width of the window signal;

means for outputting a mode signal representing a data transfer rate of the read data signal;

means, connected to the pulse width measuring means and the mode signal generating means, for generating a window gate signal based on a measurement value of the window signal from the pulse width measuring means and a data transfer rate represented by the mode signal from the mode signal outputting means; and a gate circuit, connected to the window gate signal generating means and the voltage frequency oscillator, for gating the window signal from the voltage frequency oscillator in accordance with the window gate signal.

BRIEF DESCRIPTION OF THE DRAWINGS

Other objects and features of the present invention will be apparent from the following description taken in conjunction with the accompanying drawings, in which:

FIGS. 5A through 5F are timing charts for explaining the mode of operation of the embodiment shown in FIG. 3, in which

FIGS. 7A through 7E are timing charts for explaining the mode of operation of the circuits shown in FIGS. 4A through 4D, in which

DETAILED DESCRIPTION OF THE PREFERRED EMBODIMENT

Figure 3:
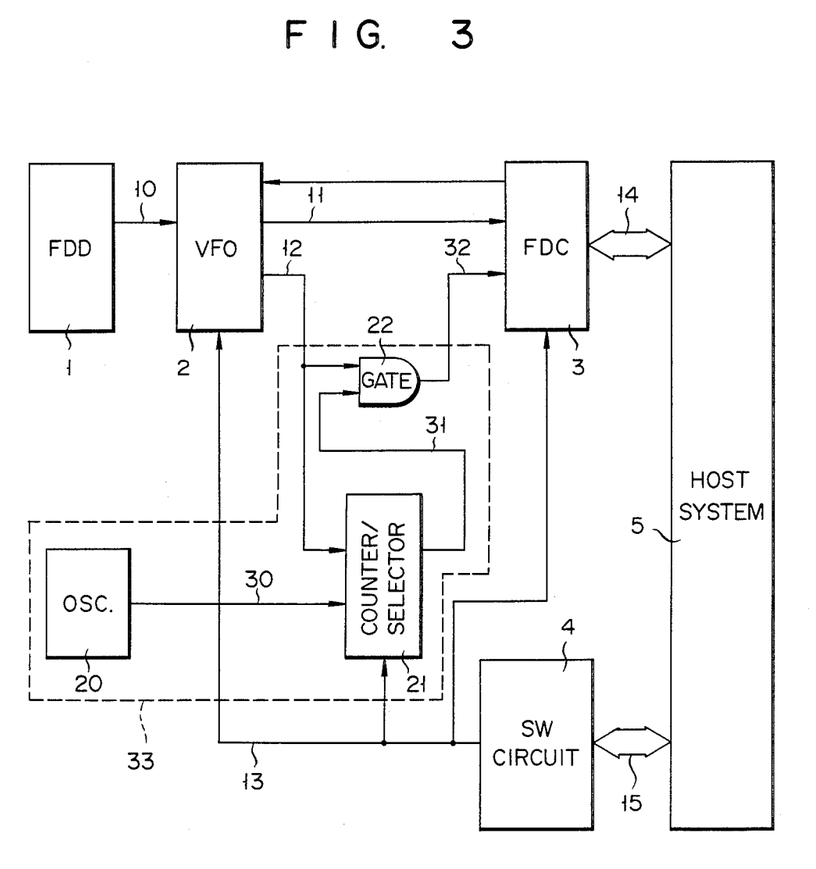
FIG. 3 is a block diagram of an FDD interface circuit according to an embodiment of the present invention.

FIG. 3 is a block diagram of an FDD interface circuit using FDD window signal gate circuit 33 according to the present invention. The same reference numerals denote the same parts as in FIG. 1. In this embodiment, gate circuit 33 indicated by the dotted line is included in the FDD interface circuit.

Counter/selector 21 receives fundamental frequency signal 30 from oscillator 20, counts the pulse width for time intervals T1 and T2 in FIGS. 5C through 5F, and supplies corresponding window gate signal 31 to gate circuit 22. Time interval T1 corresponds to a count period of counter/selector 21 in the 250 kbps mode, and time interval T2 corresponds to the count period of counter/selector 21 in the 300 kbps mode.

Figure 4A:
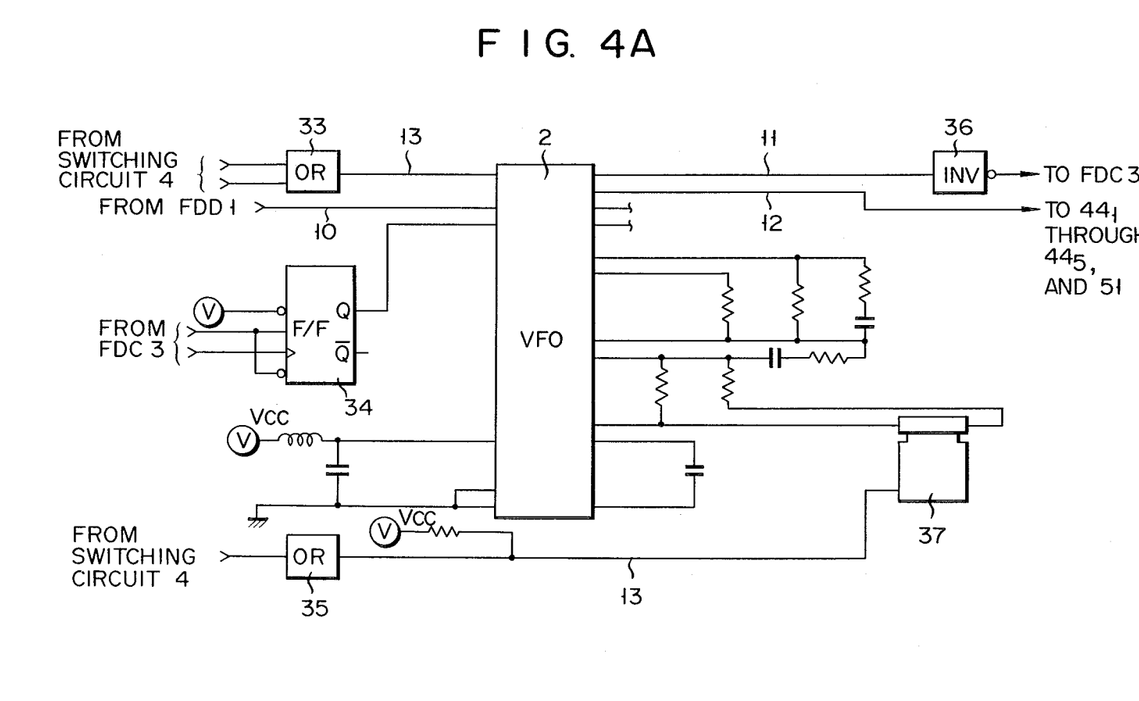
FIGS. 4A through 4D are circuit diagrams showing a counter/selector shown in FIG. 3.

FIGS. 4A through 4D are circuit diagrams of the FDD interface circuit shown in FIG. 4. FIG. 4A shows a peripheral portion of VFO 2 in FIG. 3. Mode switching signal 13 is supplied from circuit 4 to VFO 2 through OR gate 33. Raw read data 10 is supplied from FDD 1 to VFO 2. A control signal for controlling VFO 2 is supplied from FDC 3 through flip-flop (F/F) 34. Switching signal 13 is supplied to element 37. Element 37 shifts the center frequency of VFO 2. VFO 2 supplies read data signal 11 to FDC 3 through inverter 36, and also supplies window signal 12 to flip-flops $44_1$ to $44_5$ of counter/selector 21.

Figure 4B:
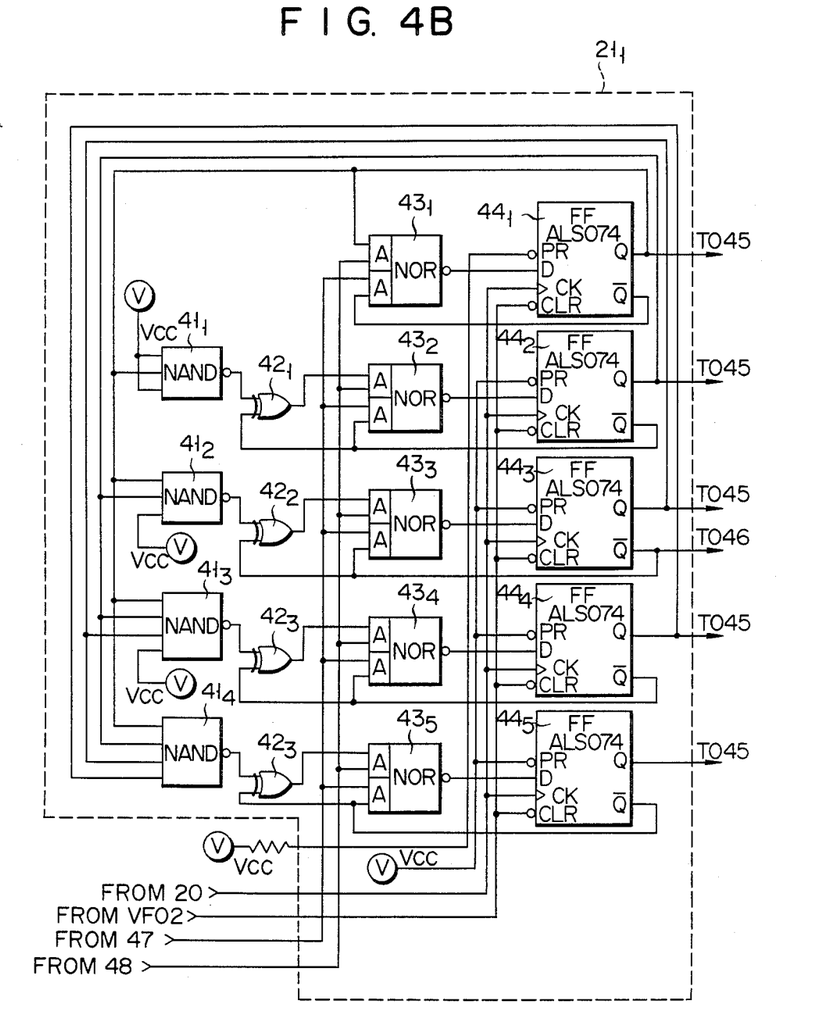

As shown in FIG. 4B, counter/selector 21 consists of NAND gates $41_1$ to $41_4$, Exclusive-OR gates $42_1$ to $42_4$, AND-NOR gates $43_1$ to $43_5$, and flip-flops $44_1$ to $44_5$. Window signal 12 is supplied as a reset signal from VFO 2 to clear terminals (CLR) of flip-flops $44_1$ to $44_5$. Clock input terminals CK of flip-flops $44_1$ to $44_5$ receive a 16-MHz fundamental frequency signal from oscillator 20. Respective flip-flops $44_1$ to $44_5$ receive at their D terminals the outputs from corresponding AND-NOR gates $43_1$ to $43_5$. The Q output from flip-flop $44_1$ is fed back to NAND gates $41_1$ to $41_4$; the Q output from flip-flop $44_2$, to NAND gates $41_2$ to $41_4$; the Q output from flip-flop $44_3$, to NAND gates $41_3$ and $41_4$; and the Q output from flip-flop $44_4$, to NAND gate $41_4$. Outputs from AND-NOR gate 47 and inverter 48 (to be described later) in FIG. 4C are supplied to AND-NOR gates $43_1$ to $43_5$.

Figure 4C:
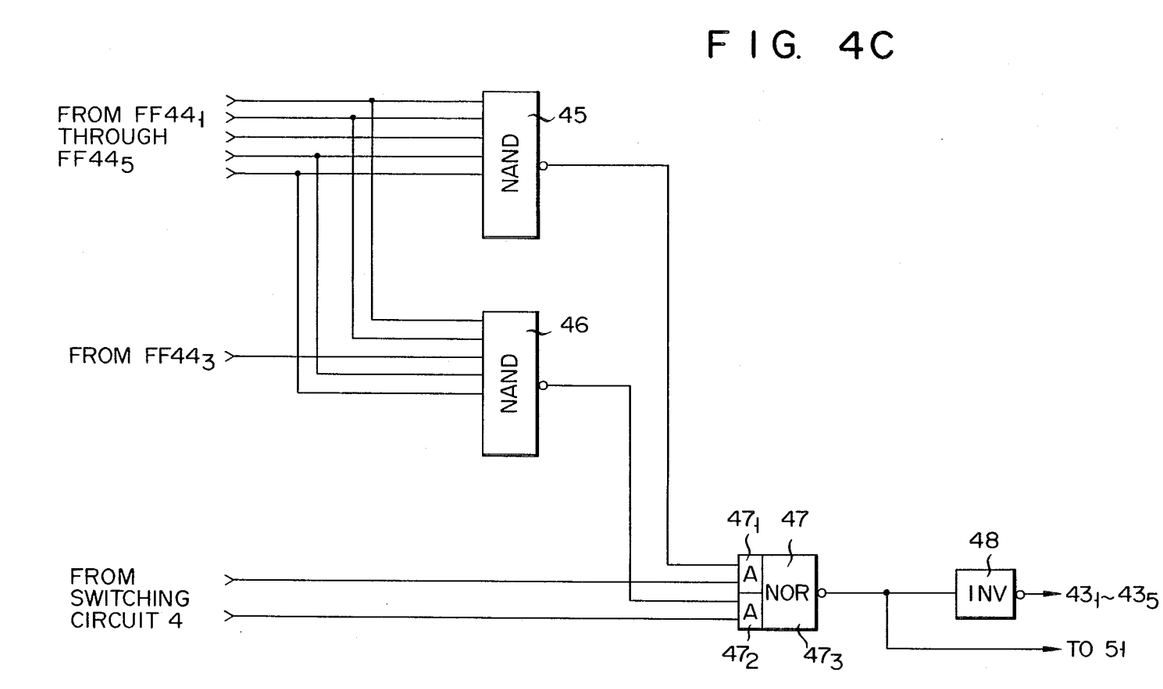

The Q outputs from flip-flops $44_1$ to $44_5$ are supplied to NAND gate 45 in FIG. 4C, and the Q outputs from flip-flops $44_1$, $44_2$, $44_4$, and $44_5$ are supplied to NAND gate 46. NAND gate 46 also receives $\bar{Q}$ output from flip-flop $44_3$.

When 5-bit counter $21_1$ in FIG. 4B has a full count, i.e., a count of "32" corresponding to 2 μsec when the fundamental frequency is 16 MHz, NAND gate 45 produces an active signal. When counter $21_1$ counts to "27", i.e., 1.7 μsec, NAND gate 46 generates an active signal.

Outputs from NAND gates 45 and 46 are supplied to AND-NOR gate 47. Switching signal 13 from switching circuit 4 is supplied to gate 47. An output from gate 47 is supplied to the D input terminal of flip-flop 51 in FIG. 4D and to AND-NOR gates $43_1$ to $43_5$ (FIG. 4B) through inverter 48. Flip-flop 51 holds the previous count of counter $21_1$ in FIG. 4B. Window signal 12 from VFO 2 is supplied to clock input terminal (CK) of flip-flop 51 through inverter 52. Window signal 12 from VFO 2 is also supplied to FDC 3 through AND gate 49. The Q and $\bar{Q}$ outputs from flip-flop 51 are supplied to selector $21_2$. Selector $21_2$ also receives, selection data, i.e., mode switching signal 13, from switching circuit 4.

The Q output signal from flip-flop 51 goes to high level (logic "1") when the pulse width of the input window pulse is longer than that counted by counter $21_1$ in FIG. 41B, and the $\bar{Q}$ output signal thereof rises to high level (logic "1") when it is shorter. In the 250 kbps mode, the Q output signal from flip-flop 51 is supplied to input terminal 2 of selector $21_2$. In the 300 kbps mode, the $\bar{Q}$ output signal from flip-flop 51 is supplied to input terminal 1 of selector $21_2$. The value of flip-flop 51 is held until a window pulse of a different period is received.

Figure 4D:
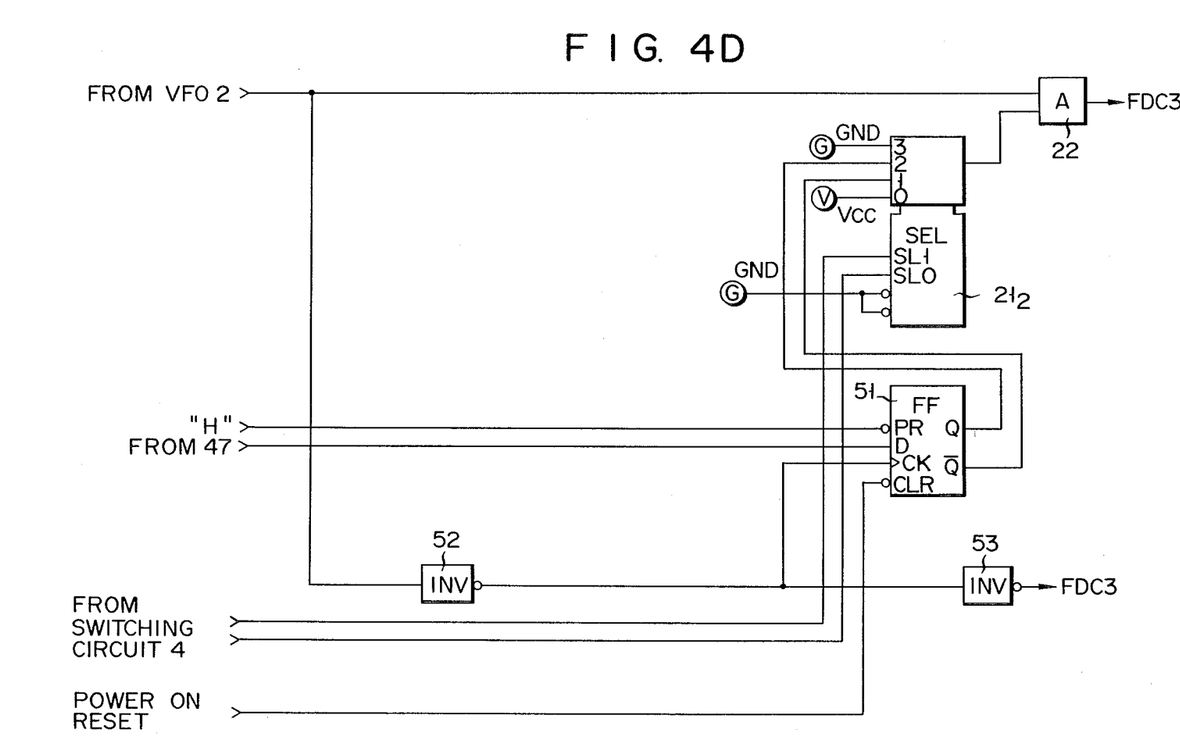

When a "0" and a "1" are respectively supplied to terminals SL0 and SL1 of selector $21_2$, input terminal 2 (250 kbps mode) is selected. When a "1" and a "0" are respectively supplied to inputs SL0 and SL1, input terminal 1 (300 kbps mode) is selected. An output signal from selector $21_2$ is supplied as an enable signal to AND gate 22. In response to this enable signal, AND gate 22 gates or does not gate the window pulse signal from VFO 2.

The mode of operation of the embodiment of the present invention will be described below. A case will be described wherein the 250 kbps mode is selected by mode switching signal 13 from switching circuit 4 under the control of host system 5.

Figure 5A:
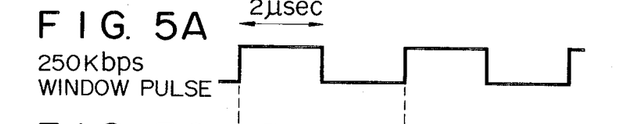
FIG. 5A shows a 250 kbps window signal.
Figure 5B:
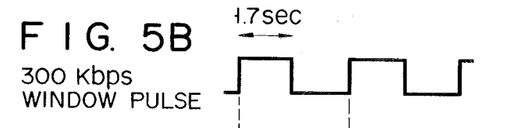
FIG. 5B shows a 300 kbps window signal.
Figure 5C:
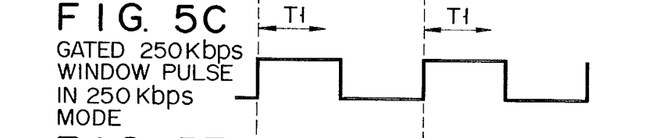
FIG. 5C shows a signal output from gate circuit 22 when a 250 kbps window signal is input in the 250 kbps mode.
Figure 5D:
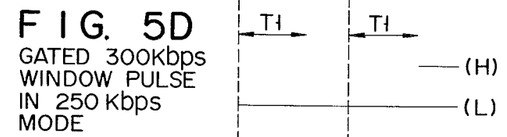
FIG. 5D shows a signal output from gate circuit 22 when a 300 kbps window signal is input in the 250 kbps mode.
Figure 5E:
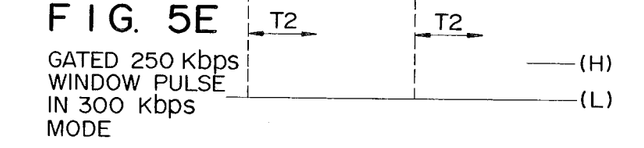
FIG. 5E shows a signal output from gate circuit 22 when a 250 kbps window signal is input in the 300 kbps mode.
Figure 5F:
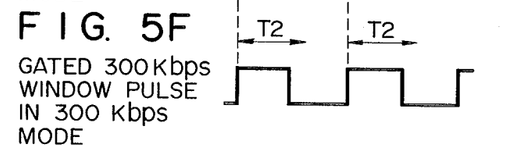
FIG. 5F shows a signal output from gate circuit 22 when a 300 kbps window signal is input in the 300 kbps mode.

(i) Assume that in this mode, 250 kbps window pulse 12 in FIG. 5A is output from VFO 2. The window pulse in this case has a period of about 4 μsec. Therefore, the significant level (active level) interval of window pulse 12 is about 2 μsec.

The counter shown in FIG. 4B is cleared when window pulse 12 goes to logic "1", and is clocked by and counts the fundamental frequency signal (16 MHz) from oscillator 20. A logic signal from NAND gate 46 is set at one input of AND gate $47_2$. A logic "0" signal is applied to the other input of AND gate $47_2$. Since the 250 kbps mode has been selected, a logic "1" signal from circuit 4 is applied to AND gate $47_1$, and a logic "0" signal is applied to AND gate $47_2$. AND gate $47_2$ receives "0" and "0" signals or "0" and "1" signals, and always outputs a "0". Therefore, the output from NOR gate $47_3$ depends only on an output from AND gate $47_1$. In other words, the output from NOR gate $47_3$ is a NOT of the output from AND gate $47_1$.

The inputs to NAND gate 45 do not become all bit "1", and the output from NAND gate 45 is therefore logic "1" until the count of counter 21 becomes "32". Then, AND gate 47 receives "1" and "1" and outputs a "1". The output from NOR gate 47 is a "0".

When the count of counter 211 reaches "32", i.e., when counter $21_1$ counts 2.0 μsec, NAND gate 45 receives all bit "1" inputs and outputs a logic "0" signal. Therefore, AND gate $47_1$ receives "0" and "1" signals. The output from AND gate $47_1$ becomes logic "0", and NOR gate $47_3$ generates a logic "1" signal. A "1" is set at the input of flip-flop 51, inputs to AND-NOR gates $43_1$ through $43_5$ are inverted, and counter $21_1$ goes into hold mode. When the window pulse goes to "0" level thereafter, the clock pulse of F/F 51 rises and a "1" is set. A high level (logic "1") signal is supplied as the Q output signal from flip-flop 51 to input terminal 2 of selector $21_2$. Circuit 4 has received "0" and "1" signals representing the 250 kbps mode at the SL0 and SL1 terminals of selector $21_2$. Then, input terminal 2 of selector $21_2$ is selected, and a high level (logic "1") signal is applied to AND gate 49. Thus, AND gate 22 passes the window pulse from VFO 2.

(ii) A case will now be described wherein a 300 kbps window pulse is generated by VFO 2 in the 250 kbps mode. In this case, a window pulse having a short, half period of 1.7 μsec is applied as a reset signal to counter $21_1$, and window pulse 12 goes to "0" before counter $21_1$ counts 2.0 μsec after it goes to "1". The output from NAND gate 45 is a "1", and logic "1" signals are applied to AND gate $47_1$. The output from NOR gate 47 goes to logic "0", which is set in flip-flop 51. Therefore, a logic "0" signal is supplied as the Q output signal to selected input terminal 2 of selector $21_2$ in the 250 kbps mode. Since a logic "0" signal has been applied to AND gate 22, a 300 kbps window pulse is blocked by AND gate 22.

(iii) A case will now be described wherein a 250 kbps window pulse is output by VFO 2 in the 300 kbps mode. In the 300 kbps mode, one input of AND gate $47_1$ is always "0", and one input of AND gate $47_2$ is always "1". Therefore, the output from NOR gate $47_3$ is a NOT of the other input of AND gate $47_2$, i.e., the output from NAND gate 46. Since the window pulse from VFO 2 supplied to counter $21_1$ as a reset signal has a transfer rate of 250 kbps, its half period is 2 μsec. Therefore, when counter $21_1$ counts up to 1.7 μsec, NAND gate 46 generates a logic "0" signal. A logic "1" signal is supplied to AND gate $47_1$, and AND gate $47_2$ receives a logic "0" signal from NAND gate 46 and a logic "1" signal representing the 300 kbps mode from switching circuit 4. NOR gate $47_3$ thus generates a logic "1" signal. A logic "1" signal is set in flip-flop 51, and a $\overline{Q}$ output signal of logic "0" is applied to input terminal 3 which has been selected in the 300 kbps mode. Since a logic "0" signal is applied to AND gate 22, the 250 kbps window pulse is blocked.

(iv) When a 300 kbps window pulse is generated by VFO 2 in the 300 kbps mode, counter 211 is reset by the 300 kbps window pulse before it counts 1.7 μsec. Therefore, the output from NAND gate 46 is logic "1". AND gate $47_2$ therefore receives logic "1" signals at its two input terminals. NOR gate 47 outputs a logic "0" signal. A logic "0" signal is set in flip-flop 51, and a logic "1" signal as its $\overline{Q}$ output signal is supplied to input terminal 1 of selector $21_2$. Selector $21_2$ applies a logic "1" signal to AND gate 22. Thus, AND gate 22 passes the 300 kbps pulse from VFO 2.

In this manner, when a window pulse having a pulse width longer than a preset width is input, a logic "1" is set. When a window pulse signal having a pulse width shorter than the preset pulse width is input, a logic "0" is set.

In the 500 kbps mode, selector $21_2$ selects the level (logic "1") at input terminal 0 regardless of the output from F/F 51. Therefore, AND gate 22 gates all pulses. This is because 500 kbps and 300 kbps are sufficiently separated, and the capture ranges do not overlap.

Figure 7A:
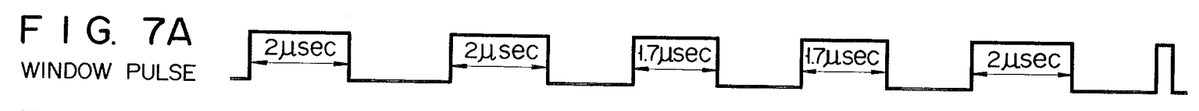
FIG. 7A shows the waveform of a window signal.
Figure 7B:
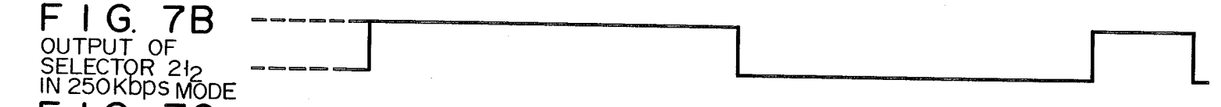
FIG. 7B shows the waveform of a signal output from selector $21_2$ in FIG. 4D in the 250 kbps mode.
Figure 7C:
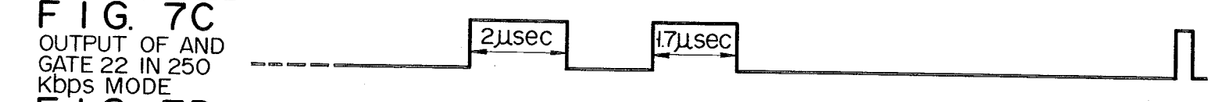
FIG. 7C shows the waveform of a signal output from AND gate 22 in FIG. 4D in the 250 kbps mode.
Figure 7D:
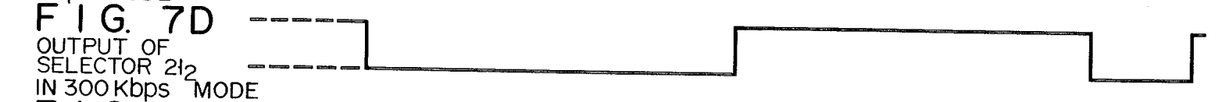
FIG. 7D shows the waveform of a signal output from selector $21_2$ in the 300 kbps mode.
Figure 7E:
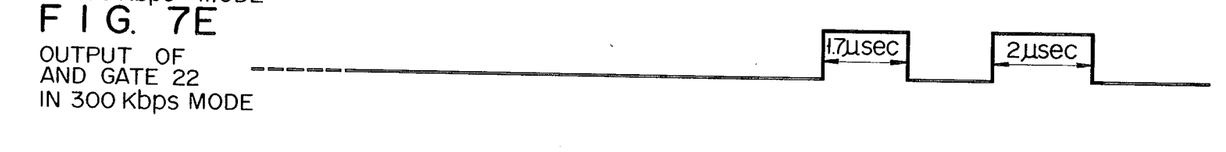
FIG. 7E shows the waveform of a signal output from AND gate 22 in the 300 kbps mode.

FIGS. 7A through 7D show the outputs from selector $21_2$ and AND gate 22 when 250 kbps and 300 kbps window pulses are both input. FIG. 7B shows the output from selector $21_2$ in the 250 kbps mode, and FIG. 7C shows the output from AND gate 22 in the 250 kbps mode. FIG. 7D shows the output from selector $21_2$ in the 300 kbps mode, and FIG. 7E shows the output from AND gate 22 in the 300 kbps mode.

Figure 6:
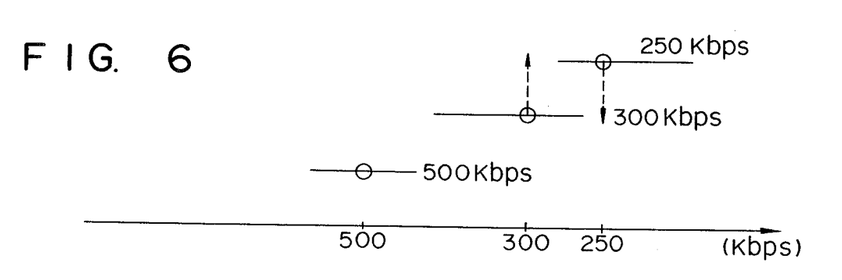
FIG. 6 is a view explaining a plurality of data transfer rates and respective capture ranges in the embodiment shown in FIG. 3.

In this manner, host system 5 correctly identifies the data transfer rate of FDD 1. As can be seen from FIG. 6, the capture range will not be so wide that 300 kbps data is read in the 250 kbps mode, or vice versa (indicated by the dotted lines in FIG. 6).

With the above arrangement, host system 5 can correctly identify the mode. If a digital counter is used as a circuit for measuring the pulse width of a window pulse, it requires no adjustment and can offer higher precision than an arrangement using an analog one-shot circuit.

Since a window pulse from which jitters such as peak shifts are removed by passing through a VFO is used for measuring the data transfer rate, the margin is wider than the case wherein raw read data is used.

In the above embodiment, a case has been described wherein a window gate circuit for setting a narrow capture range in an FDD interface circuit has been described.

However, the circuit of the present invention is similarly applicable as a means for limiting the capture range in almost all applications with PLL (phase locked loop) circuits having VFOs.

What is claimed is:

1. A floppy disk drive interface circuit in a system handling a plurality of data transfer rates, comprising:
   a floppy disk drive;
   a voltage frequency oscillator for outputting a read data signal and a window signal based on a read data pulse generated by said floppy disk drive;
   a fundamental frequency signal generator for generating a fundamental frequency signal;
   means for receiving the fundamental frequency signal from said fundamental frequency signal generator and the window signal from said voltage frequency oscillator and for measuring a pulse width of the window signal;
   means for outputting a mode signal representing a set data transfer rate of the read data signal;
   means, connected to said pulse width measuring means and said mode signal generating means, for generating a window gate signal based on a measurement value of the window signal from said pulse width measuring means and a data transfer rate represented by the mode signal from said mode signal outputting means; and
   a gate circuit, connected to said window gate signal generating means and said voltage frequency oscillator, for gating the window signal from said voltage frequency oscillator in accordance with the window gate signal.

* * * * *